3,316,235
CATALYST FOR POLYMERIZATION OF ETHYLENE AND METHOD FOR POLYMERIZING ETHYLENE USING THE CATALYST
Yoshio Tazima, Masao Iwamoto, and Sadao Yuguchi, Ohtsu-shi, Shiga-ken, Japan, assignors to Toyo Rayon Kabushiki Kaisha, Tokyo, Japan, a corporation of Japan
No Drawing. Filed July 24, 1963, Ser. No. 297,203
Claims priority, application Japan, July 27, 1962, 37/31,301; Sept. 12, 1962, 37/39,283; Nov. 5, 1962, 37/48,551; Nov. 7, 1962, 37/48,757, 37/48,758; Nov. 20, 1962, 37/50,883, 37/50,886
15 Claims. (Cl. 260—94.9)

This invention relates to a novel type catalyst for polymerization of ethylene and a method for polymerizing ethylene using the catalyst.

Many catalysts for polymerization of ethylene are already known, for example, Ziegler-Natta type catalysts, or those composed mainly of chromium oxide, molybdenum or nickel. The invention relates to a method for polymerizing ethylene in the presence of a novel catalyst entirely different from those known types, namely, that obtained by mixing essentially the two components of bis-arene-chromium compounds and organometallic compounds.

The object of the invention is to provide novel catalyst for polymerization of ethylene.

Another object of this invention is to provide a method for polymerizing ethylene with high efficiency with the use of said novel catalyst.

Still another object of the invention is to provide a method for polymerizing ethylene using the novel catalyst to obtain polyethylene of desired degree of polymerization.

Further object of the invention is to provide a method for polymerizing ethylene wherein the separation and removal of the remaining catalyst from the polymer after completion of the polymerization is easy, and so the refined polyethylene can be readily obtained. Still other objects of the invention will become apparent from the following disclosures.

We have carried out an extensive research and discovered that the catalyst system obtained by mixing essentially the two components of bis-arene-chromium compounds with organometallic compounds show remarkably excellent catalytic activity in polymerization of ethylene, and that polyethylene can be readily obtained by contacting such catalyst system with ethylene under relatively mild pressure and temperature conditions such as below 150 kg./cm.$^2$ and below 150° C.

The catalyst system used in the invention is novel and heretofore entirely unknown. The first component composing the catalyst system is bis-arene-chromium compounds which are represented by the general formula $$[(Y)_2Cr]_n^{\oplus} X^{n\ominus}$$

wherein $[(Y)_2Cr]^{\oplus}$ denotes bis-arene-chromium cation containing a hydrocarbon Y selected from the group consisting of benzene, biphenyl and their derivatives which are ring-substituted by alkyl;
$X^{n\ominus}$ denotes an anion which forms a salt with said bis-arene chromium cation; and
$n$ is an integer of at least 1, equalling the number of the electric charge of said anion.

And the second component composing the catalyst system is the organometallic compounds represented by the general formula $$R_kMZ_m$$

wherein

M is a metal of Groups I–III of the Periodic Table;
R is an alkyl group of $C_2$–$C_4$;
Z is a halogen; and
$k$ and $m$ are integers ($k \neq 0$), $k+m$ equalling the valency of said metal.

As said hydrocarbon Y in aforesaid bis-arene-chromium compound $[(Y)_2Cr]_n^{\oplus} X^{n\ominus}$, for example, alkyl- and allyl-substituted benzene derivatives such as benzene, toluene, xylene, ethyl benzene, cumene, mesitylene, and biphenyl may be named, generally benzene and biphenyl being preferred.

The anion represented by $X^{n\ominus}$ is preferably obtained from an acid group containing chromium. Suitable chromium acids which can be utilized to prepare the salts include, for example, chromic acid, bichromic acid, tetrathiocyano-diammonochromic acid and tetrathiocyano-dianilino-chromic acid.

These bis-arene-chromium compounds have the $\pi$-complex $[(Y)_2Cr]^{\oplus}$ wherein $\pi$-electron of arenes is coordinated on the orbit of Cr is the cation and X is the anion. Methods of their preparation differ depending on the specific type, but can be readily practiced as in the following illustrations.

(1) Synthesis of bis-biphenyl chromium chromate $[(\phi_2)_2Cr]_2CrO_4$ and bis-biphenyl chromium-dichromate $[(\phi_2)_2Cr]_2Cr_2O_7$.

Sublimed and refined biphenyl, aluminum chloride, chromium chloride and aluminum powder of which surfaces are well washed, are placed in a porcelain beaker, mixed well at 50° C. by stirring for 10 minutes, and reacted for 10 minutes at 140° C. The product $[(\phi_2)_2Cr][AlCl_4]$ is a $\pi$-complex. The same is hydrolyzed with methanol and water, and added with an alkali so as to maintain the pH around 7–8. After removal therefrom of unreacted substances and $Al(OH)_3$, $Cr(OH)_3$, etc. by filtration, further unreacted biphenyl is removed therefrom with benzene. Thus an aqueous solution of $[(\phi_2)_2Cr]OH$ can be obtained. Then $[(\phi_2)_2Cr]_2CrO_4$ is precipitated by adding potassium chromate $K_2CrO_4$ to the solution. The precipitate is filtered out, and after several washings with water, dried in vacuum. The product is stored as isolated from air, light and heat.

In the above, if potassium bichromate $K_2Cr_2O_7$ is used in place of potassium chromate, bis-biphenyl chromium-dichromate $[(\phi_2)_2Cr]_2 Cr_2O_7$ can be obtained, which is a reddish yellow powder, and reacts violently even with a very small amount of oxygen, and ignites. It is rather thermally unstable, and turns black when left for 20 hours at room temperature. Therefore, it is desirable that it be used for polymerization immediately after its preparation.

(2) Preparation of bis-biphenyl chromium-tetrathiocyano-diammonochromate $[(\phi_2)_2Cr] [(NH_3)_2Cr(CNS)_4]$.

Sublimed biphenyl, aluminum chloride, anhydrous chromium chloride, and aluminum powder of which surfaces are well washed are put in a porcelain beaker, well-mixed at 50° C. by stirring for 10 minutes, and reacted at 140° C. for 10 minutes. The resultant product $[(\phi_2)_2Cr][AlCl_4]$ is a $\pi$-complex. It is then hydrolyzed with methanol, and added with water. Its pH is maintained around 7–8 with alkali. By filtration, the unreacted substances and $Al(OH)_3$, $Cr(OH)_3$, etc. are removed, and further with benzene, unreacted biphenyl is removed from the above complex, and thus an aqueous solution of $$[(\phi_2)_2Cr]\cdot OH$$

is obtained. From the solution $[(\phi_2)_2Cr]$ $$[(NH_3)_2Cr(CNS)_4]$$

is precipitated by addition of Reinecke's salt $$NH_4[(NH_3)_2Cr(CHS)_4]\tfrac{1}{2}H_2O$$

The precipitate is filtered, dried, and refined by recrystallization with acetone-ether. The product is then dried in vacuum in the state isolated from light.

Next as the second component organometallic compounds for making the catalyst, lower alkyl compounds and halogenated (F, Cl, Br, I) alkyl compounds of metals of Groups I–III of the periodic table, for instance, Li, Na, Be, Mg, Zn, Sr, Cd, Hg, Al, Sc, Ga; that is, for example, ethyl, propyl, butyl and isobutyl compounds of these metals and mono-halogenated lower alkyl compounds or dihalogenated lower alkyl compounds of these metals are all useful, among which ethyl, propyl, butyl and isobutyl compounds of Li, Mg, and Al being preferred. Particularly useful however are aluminum triethyl and aluminum triisobutyl.

The catalysts of the invention are obtained by mixing the above first component with the second component in an inert atmosphere. For polymerization of ethylene, an intimate contact of ethylene with the catalyst under the conditions as shall be specified is sufficient. Conveniently, the reaction is carried out in the presence of an inert solvent with stirring for smooth progress of the reaction. The first component of the catalyst is not easy-soluble in a solvent but upon addition of the second component thereto, violently reacts to form a dark, brown liquid, and is substantially dissolved. Of course this liquid mixture can be used as the catalyst, but further its supernatant liquid only also shows sufficient activity.

Generally used are: aromatic hydrocarbons such as benzene, toluene, and xylene; aliphatic hydrocarbons such as ligroin, n-heptane, and n-hexane; cycloaliphatic hydrocarbons such as cyclohexane; and halogenated hydrocarbons such as trichloroethylene and chlorobenzene. Among these, the most suited are toluene, benzene, and n-heptane, particularly toluene. The amount of use is not critical, but normally its amount may be so selected that the concentration of the first component of the catalyst, bis-arene-chromium compound, should become about 0.1–10 g./l.

The quantitative ratio between the two components of the catalyst system may be varied within the wide range of 1:2–1:300 in terms of mol ratio, in order to carry out the polymerization smoothly. While it also depends on other polymerization conditions, when the amount of the second component is made constant, generally a large amount of the first component within the aforesaid range results in high intrinsic viscosity of the product polymer, and small amount of the first component causes the product polymer to have a low intrinsic viscosity. Thus the variation in the mol ratio can be one controllable reaction condition in order to obtain the polymer of desired properties.

For satisfactory yields, it is generally recommended that the mol ratio greater than 1:5 be selected. Particularly preferred is the range 1:10–1:150, thereby obtained polyethylenes being crystalline, clear white solid, having a melting point of about 100°–145° C.

The pressure used in polymerization reaction may be optionally selected from the range of 0–150 kg./cm.² gauge pressure, the tendency being that with the increase in pressure, yield of polymer increases. However, too high a pressure sometimes causes coloration of the polymer and complicates its refining process. Also for ease of operation 5–80 kg./cm.² are preferred.

The polymerization temperature may be 10–180° C., preferably 20°–90° C., the optimum range being determined by the type of the catalyst used. Generally under low temperatures, polymers of high intrinsic viscosity and high melting point are obtained, and at high temperatures, polymers of low intrinsic viscosity and melting point are obtained.

Thus with the catalysts and the process of the invention, ethylene can be polymerized at a good yield under relatively mild conditions, further with such an advantage that by proper selection of conditions, polyethylene having desired properties can be obtained. Still another conspicuous advantage of this invention is that the removal of catalyst fragments from the product polymer is very easy. That is, in the conventional polymerization of ethylene with known catalysts, considerably troublesome refining operation is required to remove the catalysts from produced polyethylene. Whereas, for removing the catalyst from the produced polymer of the applicant's process, a washing with an alcohol such as methanol, or acetone is sufficient, and thus purified polyethylene can be very simply obtained.

The catalysts and the process of the invention are not confined for polymerization of ethylene, but can be used for copolymerization of ethylene with other olefins such as propylene.

Hereinafter the invention shall be explained with reference to examples, it being understood that the invention is in no way limited thereby, but the examples are intended only for illustration purpose. In the following, the intrinsic viscosity $[\eta]$ of the polymer obtained is measured in tetrahydronaphthalene as solvent at 135° C. with Ubbelohde viscometer.

*Example 1*

A 100 cc. autoclave was charged with 0.1 g. of bis-biphenyl chromium-tetrathiocyano-diammonochromate $[(C_6H_5\cdot C_6H_5)_2Cr][(NH_3)_2Cr(SCN)_4]$, 5 mmol of aluminium triisobutyl (mol ratio 1:34), and 50 cc. of toluene, to which ethylene was introduced until the pressure of 40 kg./cm.² was reached, and polymerized at 100° C. The reaction was stopped after 30 minutes, yielding 8 g. of polyethylene having a M.P. of 118–124° C.

*Example 2*

A 100 cc. autoclave equipped with an electromagnetically rotated agitator was charged with 0.1 g. of bis-mesitylene chromium-tetrathiocyana-diammonochromate, 5 mmol of aluminium triisobutyl (mol ratio 1:31), and 50 cc. of toluene. Into the same ethylene was introduced until the pressure of 60 kg./cm.² was reached at 100° C., and reacted for 3 hours with stirring. The resultant polymer was refluxed in methanol-hydrochloric acid (1:1) solution, filtered, washed and dried under vacuum. The yield was 8 g., and the polymer had a M.P. of 125–130° C.

*Example 3*

A 200 cc. autoclave equipped with an electromagnetically rotated agitator was charged with 0.05 g. of bis-benzene chromium-tetrathiocyano-diammonochromate, 2.5 cc. of a 2 mol/100 cc. solution of aluminum triisobutyl in toluene (mol ratio 1:21), and 60 cc. of toluene, to which further ethylene was introduced until a pressure of 40 kg./cm.² was reached. The ethylene was immediately absorbed and the pressure fell. Then the charging was repeated four times, and after the fifth charging the pressure of 40 kg./cm.² was attained. Then the reactants were reacted for about 1 hour with stirring. After an hour gas was discharged and the reaction was stopped. White product was obtained. The polymer yield weighed 12.8 g., and had a M.P. of 125–135° C.

*Example 4*

Ethylene was polymerized in the presence of bis-biphenyl-chromium chromate-aluminium triisobutyl catalyst system at varied mol ratios, with the results as shown in Table I. The temperature was 75° C., ethylene pressure was 40 kg./cm.², and the solvent was toluene.

TABLE I

| $[(\phi_2)_2Cr]_2CrO_4$ (g.) | $Al(C_4H_9)_3$ (mmol) | Mol ratio in catalyst system | Reaction time (min.) | Polymer obtained (g.) | Amount of polymer obtained per hour per 1 g. of catalyst (g.) | M.P. (° C.) |
|---|---|---|---|---|---|---|
| 0.03 | 4 | 112 | 12 | 7.26 | 1,210 | 108–120 |
| 0.035 | 4 | 96 | 12 | 10.53 | 1,500 | 109–121 |
| 0.040 | 4 | 84 | 8 | 6.96 | 1,300 | 109–124 |
| 0.045 | 4 | 74 | 7 | 5.34 | 1,020 | 113–124 |
| 0.050 | 4 | 67 | 8 | 6.37 | 950 | 113–127 |
| 0.055 | 4 | 61 | 9 | 7.84 | 950 | 118–123 |
| 0.060 | 4 | 56 | 7 | 6.78 | 950 | 117–124 |
| 0.065 | 4 | 51 | 5 | 1.49 | 470 | 110–131 |

*Example 5*

Ethylene was polymerized in the presence of a catalyst system composed of 0.05 g. of bis-phenyl chromium chromate and 4 mol of aluminium triisobutyl (mol ratio 1:67), under temperatures varied from 40–80° C., other conditions being the same to those of Example 11. The results were as shown in Table II.

TABLE II

| Reaction temp. (° C.) | Reaction time (min.) | Polymer obtained (g.) | Amount of polymer obtained per hour per 1 g. of catalyst (g.) | Properties of the polymer | |
|---|---|---|---|---|---|
| | | | | $[\eta]$ | M.P. (° C.) |
| 40 | 53 | 5.07 | 124 | 4.74 | 117–132 |
| 50 | 23 | 5.23 | 271 | 3.45 | 117–132 |
| 60 | 10 | 4.75 | 570 | 2.86 | 117–132 |
| 70 | 7 | 4.16 | 832 | 1.01 | 117–132 |
| 75 | 8 | 6.37 | 945 | 0.85 | 113–127 |
| 80 | 11 | 5.40 | 640 | 0.79 | 111–126 |

As can be observed from Table II, in the present case the best yield was obtained at the reaction temperature of 60–80° C. Concerning the properties of the polymer, from the Tables I and II it can be understood that the smaller is the mol ratio in the catalyst system and the lower is the reaction temperature, generally polymer of higher melting point is obtained. Thus by selection of suitable conditions, polymers of desired properties can be obtained.

*Example 6*

Ethylene was polymerized each time with varied type of solvent. The reaction conditions were: ethylene was introduced to a 100 cc. autoclave charged with 0.04 g. of bis-phenyl chromium chromate, 70 cc. of a solvent, and 4 mmol of aluminium triisobutyl (mol ratio 1:84), at 75° C. at a pressure of 40 kg./cm.² The results were as shown in Table III.

TABLE III

| Solvent | Reaction time (min.) | Polymer obtained (g.) | Polymer obtained per 1 g. of catalyst per hour (g.) |
|---|---|---|---|
| Toluene | 5 | 4.09 | 1,230 |
| Benzene | 20 | 12.00 | 900 |
| Heptane | 20 | 11.20 | 840 |

*Example 7*

Ethylene was polymerized in the presence of bis-biphenyl chromium chromate-aluminium tripropyl catalyst system, each time using different solvent. The reaction conditions were: ethylene was introduced at a pressure of 40 kg./cm.² at 75° C. into a 100 cc. autoclave charged with 0.04 g. of bis-biphenyl chromium chromate, 70 cc. of solvent, and 1 cc. of aluminium tripropyl (mol ratio 1:109). The results were as shown in Table IV.

TABLE IV

| Solvent | Reaction time (min.) | Polymer obtained (g.) | Polymer obtained per 1 g. of catalyst per hour (g.) |
|---|---|---|---|
| Toluene | 60 | 1.62 | 45 |
| Benzene | 60 | 1.41 | 30 |
| Heptane | 60 | 0.92 | 26 |

*Example 8*

Similarly to Example 7, ethylene was polymerized in the presence of bis-biphenyl chromium chromate-aluminium triethyl catalyst system with varied solvents. The reaction conditions were: ethylene was introduced at the pressure of 40 kg./cm.² at 75° C. into a 100 cc. autoclave charged with 0.04 g. of bis-biphenyl chromium chromate, 70 cc. of solvent, and 1 cc. of aluminium triethyl (mol ratio 1:152). The results were as shown in Table V.

TABLE V

| Solvent | Reaction time (min.) | Polymer obtained (g.) | Polymer obtained per 1 g. of catalyst per hour (g.) |
|---|---|---|---|
| Toluene | 60 | 12.01 | 300 |
| Benzene | 60 | 10.42 | 260 |
| Heptane | 60 | 8.41 | 210 |

From the results of Tables III–V, the order by activity of aluminum trialkyls is:

$$Al(C_4H_9)_3 > Al(C_2H_5)_3 > Al(C_3H_7)_3$$

and the order of the solvents by preference is:

$$toluene > benzene > heptane$$

Example 9

In 70 cc. of toluene, 0.05 g. of bis-biphenyl chromium-tetrathiocyano-diammonochromate was dissolved. The mixture was charged into a 100 cc. autoclave, added with 4 mmol of aluminium triisobutyl (mol ratio 1:54). Further ethylene was introduced thereinto until the ethylene pressure reached 40 kg./cm.$^2$ and polymerized at each different temperature within the range of 30–150° C. The results obtained were as in Table VI.

TABLE VI

| Polymerization temp. (° C.) | Time until stirring was stopped (min.) | Reaction time (min.) | Polymer obtained (g.) | Polymer obtained per 1 g. of catalyst per hour (g.) | Properties of polymer | |
|---|---|---|---|---|---|---|
| | | | | | [η] | M.P. (° C.) |
| 30 | 13 | 15 | 3.8 | 300 | 6.83 | 110–132 |
| 40 | 7 | 15 | 5.7 | 450 | 5.34 | 112–137 |
| 50 | 3 | 15 | 9.8 | 780 | 3.34 | 110–124 |
| 60 | 7.5 | 15 | 8.3 | 660 | 2.28 | 110–127 |
| 70 | 10 | 15 | 6.5 | 520 | 1.94 | 98–120 |
| 80 | (not stopped) | 15 | 2.1 | 170 | ------ | ------ |
| 100 | (not stopped) | 15 | 1.0 | 80 | 0.77 | 98–114 |
| 150 | (not stopped) | 15 | 0.8 | 64 | 0.13 | 97–112 |

Thus Table VI shows that good yield can be obtained at the temperature range of 40°–70° C., and that as the intrinsic viscosity [η] and melting point of the polymer varies with the polymerization temperature, the porperties of the polymer obtained can be controlled as desired.

Example 10

Ethylene was polymerized using bis-biphenyl chromium-tetrathiocyano-dimmonochromate-aluminium triisobutyl catalyst system, at varied mol ratios between the two components of the catalyst. The reaction conditions were: temperature, 50° C., ethylene pressure, 40 kg./cm.$^2$, amount of toluene, 70 cc., and the reaction time, 7 minutes. The results obtained were as in Table VII.

TABLE VII

| Catalyst system | | Mol ratio in catalyst | Polymer obtained (g.) | Polymer obtained per 1 g. of catalyst per hour (g.) | Properties of polymer | |
|---|---|---|---|---|---|---|
| [(φ$_2$)$_2$Cr][(NH$_3$)$_2$Cr(CNS)$_4$] (g.) | Al(C$_4$H$_9$)$_3$ (mmol) | | | | [η] | M.P. (° C.) |
| 0.05 | 2 | 27 | 4.0 | 850 | 3.42 | 111–127 |
| 0.05 | 4 | 54 | 3.7 | 780 | 3.34 | 110–124 |
| 0.05 | 6 | 71 | 5.4 | 1,100 | 2.67 | 110–128 |
| 0.05 | 8 | 108 | 5.2 | 1,080 | 2.45 | 108–126 |
| 0.05 | 10 | 135 | ----- | ----- | 2.28 | 100–126 |

Table VII shows that with mol ratio between the two components of the catalyst greater than about 20, good yield can be obtained.

Example 11

In 70 cc. of toluene, 0.05 g. (0.074 mmol) of bis-biphenyl chromium-tetrathiocyano-diammonochromate was dissolved, put in a 100 cc. autoclave equipped with an electromagnetically rotated agitator, and added with 4 mmol of aluminium triisobutyl Al(C$_4$H$_9$)$_3$ (mol ratio 1:54). Ethylene was introduced thereinto until the pressure of 40 kg./cm.$^2$ was reached, and polymerized while the temperature was maintained at 50° C. After 15 minutes, 9.8 g. of white polyethylene was obtained. The polyethylene produced had a melting point of 110–124° C., and an intrinsic viscosity of 3.34.

Example 12

When the experiment of Example 11 was repeated except that the reaction temperature was changed to 60° C., 8.3 g. of white polyethylene was obtained. The same had a melting point of 110–127° C., and an intrinsic viscosity of 2.28.

Example 13

To 0.05 g. of bis-biphenyl chromium-tetrathiocyano-diammonochromate, 6 mmol of aluminum triisobutyl (mol ratio 1:81) was added, and put in a 100 cc. autoclave together with 70 cc. of toluene as the solvent. Into that autoclave ethylene was introduced until the pressure reached 40 kg./cm.$^2$g.; and polymerized at 50° C. After 7 minutes of the reaction, 5.4 g. of polymer was obtained. This polyethylene had a melting point of 110–128° C. and an intrinsic viscosity of 2.67.

Example 14

When the experiment of Example 13 was repeated except that the amount of aluminum triisobutyl was changed to 8 mmol (mol ratio to bis-biphenyl chromium-tetrathiocyano-diammonochromate, 1:108), 5.2 g. of white polyethylene was obtained. This polyethylene had a melting point of 108–126° C., and an intrinsic viscosity of 2.45.

Example 15

A 200 cc. autoclave equipped with an electromagnetically rotated agitator was charged with 0.05 g. of bis-benzene chromium-tetrathiocyanodiammonochromate $$[Cr(C_6H_6)_2][Cr(NH_3)_2(NCS)_4]$$

5 mmol of aluminum triisobutyl (mol ratio 1:68) and 60 cc. of toluene. While the temperature was maintained at 20–30° C., ethylene was introduced into the autoclave until the pressure reached 40 kg./cm.$^2$g., and polymerized. After 1 hour, 13 g. of white polyethylene was obtained, which had a melting point of 130–135° C., and an intrinsic viscosity of 10.80.

Example 16

When the experiment of Example 15 was repeated except that the reaction temperature was changed to 40° C., 12.8 g. of white polyethylene was obtained which had a melting point of 124–127° C.

Example 17

When the experiment of Example 15 was repeated except that the reaction temperature was changed to 60–80° C., 11 g. of white polyethylene per 1 gram of bis-benzene chromium-tetrathiocyanodiammonochromate was obtained by an hour. The product had a melting point of 125–130° C.

Example 18

To 0.025 g. of bisbenzene chromium-tetrathiocyanodiammonochromate, aluminum triisobutyl was added in such an amount as will make the mol ratio between the two 1:5, and put in a 200 cc. autoclave together with 60 cc. of toluene as the solvent. Ethylene was introduced thereinto and polpmerized for an hour at 40° C. with the initial pressure of 40 kg./cm.$^2$g. 13 g. of white polyethylene having a melting point of 118–127° C. was obtained.

Example 19

The experiment of Example 18 was repeated except that the mol ratio of aluminum triisobutyl to 0.05 g. of bis-benzene chromium-tetrathiocyanodiammonochromate was made 1:15. 10.3 g. of polyethylene was obtained.

Example 20

The experiment of Example 18 was repeated except that 0.05 g. of bis-benzene chromium-tetrathiocyanodiammonochromate was used at the mol ratio of the chromate to aluminum triisobutyl of 1:50. After an hour, about 750 g. of polyethylene per 1 g. of bis-benzene chromium-tetrathiocyanodiammonochromate used was obtained. The product polyethylene had a melting point of 127–130° C.

Example 21

Ethylene was polymerized as in Example 18 except that aluminum triisobutyl was used at 300 times in mol ratio of bis-benzene chromium-tetrathiocyanodiammonochromate. 11.8 g. of white polyethylene was obtained.

Example 22

A 200 cc. autoclave was charged with 0.05 g. of bis-benzene chromium-tetrathiocyanodiammonochromate, 5 mmol of aluminum triisobutyl (mol ratio 1:68) and 60 cc. of toluene. Ethylene was introduced thereinto and polymerized at 50° C. under the constant pressure of 5 kg./cm.$^2$g. After 45 minutes, 26 g. of white polyethylene was obtained.

Example 23

The experiment of Example 22 was repeated except that the ethylene pressure was maintained at 30 kg./cm.$^2$g. After an hour, 10.3 g. of polyethylene was obtained, which had a melting point of 122–128° C.

Example 24

Example 22 was repeated except that the ethylene pressure was made 50 kg./cm.$^2$g. After an hour, 14.8 g. of white polyethylene was obtained.

Example 25

Example 22 was repeated except that the ethylene pressure was made 70 kg./cm.$^2$g. After an hour, 20.1 g. of polyethylene was obtained. The product was colored dark-grey.

Example 26

Example 16 was repeated except that the solvent was made n-heptane. After 90 minutes, 13.8 g. of white product was obtained.

Example 27

Example 26 was repeated except that the solvent was changed to benzene, and 16.3 g. of polyethylene was obtained. The product had a melting point of 124–130° C.

Example 28

Example 26 was repeated except that cyclohexane was used as the solvent. 6.4 g. of polyethylene was obtained, which had a melting point of 131–142° C.

Example 29

A 200 cc. autoclave was charged with 0.05 g. of bis-benzenechromium tetrathiocyanodianilinchromate, 5 mmol of aluminum triisobutyl (mol ratio 1:68) and 60 cc. of toluene. Ethylene was polymerized therein at 40° C. for an hour, with the initial ethylene pressure of 40 kg./cm.$^2$g. The resulted crude product was readily refined to pure white polyethylene upon addition of methanol. The polyetylene yield was 18.5 g. Again when the reaction was started at 20° C. at the ethylene pressure of 40 kg./cm.$^2$g.; the temperature rose to 45° C. within 15 minutes, and in the meantime, 8.4 g. of polyethylene was produced.

Example 30

Eethylene was polymerized in the presence of bisphenyl chromium dichromate [$(\phi)_2$Cr]$_2$Cr$_2$O$_7$-aluminum triisobutyl catalyst system, with each time varied mol ratio between the two components of the catalyst from 37–94. The reaction was carried out at 80° C. and 40 kg./cm.$^2$, and the solvent used was 70 cc. of toluene. The results are shown in Table VIII.

TABLE VIII

| Catalyst system | | Mol ratio in catalyst | Reaction time (min.) | Polymer obtained (g.) | Polymer obtained per 1 g. of [$\phi_2$)$_2$Cr]$_2$Cr$_2$O$_7$ per hour (g.) |
|---|---|---|---|---|---|
| [$\phi_2$)$_2$Cr]$_2$Cr$_2$O$_7$ (g.) | Al(i-C$_4$H$_9$)$_3$ (mol) | | | | |
| 0.04 | 4 mmol | 94 | 5 | 7.98 | 2,700 |
| 0.05 | 4 mmol | 75 | 5 | 9.18 | 2,200 |
| 0.075 | 4 mmol | 50 | 3 | 8.05 | 2,150 |
| 0.1 | 4 mmol | 37 | 3 | 8.87 | 1,770 |

By Table VIII, it can be understood that with this catalyst system, polyethylene can be obtained at high yields at the specified range of mol ratios.

Example 31

Using the same catalyst system as in Example 30, the influence of polymerization temperature on polymer yield was examined. Namely, a 100 cc. autoclave was charged with 0.04 g. of bis-biphenyl chromium dichromate, 4 mmol of aluminum triisobutyl (mol ratio 1:94), and 70 cc. of toluene, and ethylene was polymerized therein at the ethylene pressure of 40 kg./cm.$^2$.

The results as shown in Table IX were obtained.

TABLE IX

| Polymerization temp. (° C.) | Reaction time (min.) | Polymer obtained (g.) | Polymer obtained per 1 g. of [(φ₂)₂Cr]₂Cr₂O₇ per hour (g.) |
|---|---|---|---|
| 50 | 10 | 2.65 | 400 |
| 60 | 10 | 3.64 | 550 |
| 65 | 10 | 5.32 | 800 |
| 70 | 10 | 8.30 | 1,200 |
| 75 | 5 | 9.02 | 2,700 |
| 80 | 5 | 7.98 | 2,400 |
| 85 | 5 | 6.62 | 2,000 |
| 90 | 10 | 6.12 | 920 |
| 120 | 10 | 2.03 | 300 |

As is apparent also from the above Table IX, at the polymerization temperatures of 50–120° C., particularly at 70–85° C., the named catalyst shows the highest activity.

Example 32

In the polymerization of ethylene using bis-biphenyl chromium dichromate-aluminum triisobutyl catalyst system, the influences of the mol ratios between the two components of the catalyst and the polymerization temperature on the properties of the product polymer (intrinsic viscosity and melting point) were examined. The results were as shown in Table X.

TABLE X

| Catalyst system | | Mol ratio in catalyst | Reaction temp. (° C.) | Properties of polymer | |
|---|---|---|---|---|---|
| [(φ₂)₂Cr]₂Cr₂O₇ (g.) | Al(i-C₄H₉)₃ (mol) | | | [η] | M.P. (° C.) |
| 0.04 | 4 mmol | 94 | 50 | 5.79 | 120–125 |
| 0.04 | 4 mmol | 94 | 80 | 2.01 | 110–120 |
| 0.04 | 4 mmol | 94 | 20 | 0.30 | 100–110 |
| 0.05 | 4 mmol | 75 | 80 | 2.30 | 110–120 |
| 0.075 | 4 mmol | 50 | 80 | 3.12 | 115–124 |
| 0.1 | 4 mmol | 37 | 80 | 3.53 | 115–125 |

Table X shows that the properties of the product polymer vary with the changes in mol ratio of catalyst components and polymerization temperature. Thus by suitable selection of reaction conditions, polymer of desired properties can be obtained.

Example 33

A 100 cc. autoclave was charged with 0.04 g. of bis-biphenyl-chromium dichromate, 4 mmol of aluminum triisobutyl (mol ratio 1:94) and 70 cc. of toluene. After nitrogen-substituting the reaction system, ethylene was introduced thereinto at 40 kg./cm.², and reacted at 75° C. After 4 minutes the stirring was stopped. After 5 minutes of reaction, the reaction was stopped and the polymer was withdrawn. 9.2 g. of polyethylene was obtained.

Example 34

A 100 cc. autoclave was charged with 0.1 g. of bis-biphenyl-chromium dichromate, 4 mmol of aluminum triisobutyl (mol ratio 1:37) and 70 cc. of toluene. After nitrogen-substituting the reaction system, ethylene was introduced thereinto at 40 kg./cm.², and reacted at 80° C. After 2 minutes the stirring was stopped, and the reaction was stopped after 3 minutes. From the product polymer, catalyst fragments were removed by addition of methanol and hydrochloric acid. 8.9 g. of polyethylene was obtained.

We claim:
1. A catalyst system for the polymerization of ethylene which comprises a mixture of
    (a) a bis-arene-chromium compound represented by the formula

$$[(Y)_2Cr]_n^{\oplus} X^{n\ominus}$$

wherein [(Y)₂Cr] represents a bis-arene-chromium cation containing a hydrocarbon Y selected from the group consisting of benzene, biphenyl, and their derivatives which are ring-substituted by alkyl,
X is an anion of an acid radical selected from the group consisting of chromic acid, bichromic acid, tetrathiocyanodiammonochromic acid and tetrathiocyanodianilinochromic acid radical,
n is an integer of 1 or 2, equalling the number of the electric charge of said anion, and
    (b) an organometallic compound of the general formula $$R_k M Z_m$$

wherein M is a metal of Groups I–III of the periodic table,
R is an alkyl group of C₂–C₄,
Z is a halogen,
k is a positive integer and
m is zero or a positive integer,
k+m equalling the valency of said metal, the mol ratio of (a) to (b) being 1:2–1:300.
2. The catalyst system of claim 1 wherein the Y in the bis-arene-chromium compound [(Y)₂Cr]ₙ⊕Xⁿ⊖ is a hydrocarbon selected from the group consisting of benzene, toluene, mesitylene, and biphenyl.
3. The catalyst system of claim 1 wherein the M in the organometallic compound RₖMZₘ is a metal selected from the group consisting of Li, Mg and Al, R is an alkyl group selected from the group consisting of ethyl, propyl, butyl and isobutyl, and m is zero.
4. The catalyst system of claim 1 wherein the Y in the bis-arene-chromium compound [(Y)₂Cr]ₙ⊕Xⁿ⊖ is a hydrocarbon selected from the group consisting of benzene, toluene, mesitylene, and biphenyl; M in the organometallic compound RₖMZₘ is a metal selected from the group consisting of Li, Mg, and Al; R is an alkyl group selected from the group consisting of ethyl, propyl, butyl and isobutyl, and m is zero.
5. Process for polymerization of ethylene which comprises intimately contacting ethylene with a catalyst obtained by mixing essentially two compounds of
    (a) a bis-arene-chromium compound, represented by the general formula $$[(Y)_2Cr]_n^{\oplus} X^{n\ominus}$$

wherein [(Y)₂Cr] represents a bis-arene-chromium cation containing a hydrocarbon Y selected from the group consisting of benzene, biphenyl, and their derivatives which are ring-substituted by alkyl,
X is an anion of an acid radical selected from the group consisting of chromic acid, bichromic acid, tetrathiocyanodiammonochromic acid and tetrathiocyanodianilinochromic acid radical,
n is an integer of 1 or 2, equalling the number of the eelctric charge of said anion, and
    (b) an organometallic compound of the general formula $$R_k M Z_m$$

wherein M is a metal of Groups I–III of the periodic table,
R is an alkyl group of $C_2$–$C_4$,
Z is a halogen,
$k$ is a positive integer and
$m$ is zero or a positive integer,
$k$ & $m$ equalling the valency of said metal, the mol ratio of (a) to (b) being 1:2–1:300, at a temperature of 10–180° C., and 0–150 kg./cm.² gauge pressure.

6. The process of claim 5 wherein the polymerization is carried out in the presence of an inert solvent.

7. The process of claim 6 wherein the inert solvent is a hydrocarbon selected from the group consisting of heptane, benzene, toluene and cyclohexane.

8. The process of claim 5 wherein Y in the component (a) of the catalyst, bis-arene-chromium compound $[(Y)_2Cr]_n^{\oplus}X^{n\ominus}$, is a hydrocarbon selected from benzene, toluene, mesitylene, and biphenyl.

9. The process of claim 5 wherein M in the component (b) of the catalyst, organometallic compound $R_kMZ_m$, is a metal selected from Li, Mg and Al; R is an alkyl group selected from ethyl, propyl, butyl and isobutyl; and $m$ is zero.

10. The process of claim 5 wherein Y in the bis-arene-chromium compound $[(Y)_2Cr]_n^{\oplus}X^{n\ominus}$ is a hydrocarbon selected from benzene, toluene, mesitylene, and biphenyl; M in the organometallic compound $R_kMZ_m$ is a metal selected from Li, Mg, and Al; R is an alkyl group selected from ethyl, propyl, butyl and isobutyl; and $m$ is zero.

11. Process for polymerization of ethylene which comprises intimately contacting ethylene with a catalyst obtained by mixing essentially bis-biphenyl chromium chromate and aluminum triisobutyl at a mol ratio of 1:10–1:150, in the presence of toluene at the temperature of 60°–80° C., under 30–80 kg./cm.² gauge pressure.

12. Process for polymerization of ethylene which comprises intimately contacting ethylene with a catalyst obtained by mixing essentially bis-biphenyl chromium bichromate and aluminum triisobutyl at a mol ratio of 1:10–1:150, in the presence of toluene at the temperature of 50°–120° C., under 30–80 kg./cm.² gauge pressure.

13. Process for polymerization of ethylene which comprises intimately contacting ethylene with a catalyst obtained by mixing essentially bis-biphenyl chromium tetrathiocyanodiammonochromate and aluminum triisobutyl at a mol ratio of 1:10–1:150, in the presence of toluene at the temperature of 40°–70° C., and under 30–80 kg./cm.² gauge pressure.

14. Process for polymerization of ethylene which comprises intimately contacting ethylene with a catalyst obtained by mixing essentially bis-benzene chromium tetrathiocyanodiammonochromate and aluminum triisobutyl at a mol ratio of 1:10–1:150, in the presence of toluene at the temperature of 0°–60° C., under 30–80 kg./cm.² gauge pressure.

15. Process for polymerization of ethylene which comprises intimately contacting ethylene with a catalyst obtained by mixing essentially bis-benzene chromium tetrathiocyanodianilinochromate and aluminum triisobutyl at a mol ratio of 1:10–150, in the presence of toluene at the temperature of 0°–60° C., under 30–80 kg./cm.² gauge pressure.

References Cited by the Examiner
UNITED STATES PATENTS

| | | | |
|---|---|---|---|
| 2,985,640 | 5/1961 | Loeb | 260—94.9 |
| 3,033,878 | 5/1962 | Feiss et al. | 260—94.9 |
| 3,149,080 | 9/1964 | Gluesenkamp | 260—94.9 |

JOSEPH L. SCHOFER, *Primary Examiner.*

M. B. KURTZMAN, *Assistant Examiner.*